Patented Sept. 15, 1942

2,295,870

UNITED STATES PATENT OFFICE 2,295,870

PREPARATION OF NICOTINIC ACID

Howard F. Seibert and Joseph M. Tabor, Cleveland, and Juro Wyeno, Chagrin Falls, Ohio, assignors, by mesne assignments, to S. M. A. Corporation, Chicago, Ill., a corporation of New Jersey No Drawing. Application November 17, 1939, Serial No. 305,038

2 Claims. (Cl. 260—295)

The use of nicotinic acid; 2-pyridine-carboxylic acid, and nicotinic acid amide in vitamin therapy for the treatment of human pellagra and canine black tongue necessitates the production of the acid in greater quantities and at minimum expense.

We have discovered a method of preparation by which nicotinic acid may be produced in larger proportion as compared to prior utilized processes.

The process contemplates, broadly, the use of quinoline, potassium permanganate, copper sulfate pentahydrate, sulfuric acid and sodium hydroxide in a method of which the following is an illustrative example.

The materials used and the amounts thereof, for a particular recovery of nicotinic acid, are shown by the following table.

| | |
|---|---|
| Quinoline _____pounds__ | 280 |
| Potassium permanganate _____do____ | 2000 |
| Copper sulfate pentahydrate (CuSO$_4$—5H$_2$O)_____pounds__ | 400 |
| Sulfuric acid _____do____ | 420 |
| Sodium hydroxide _____do____ | 110 |
| "Filter-cel" (diatomaceous earth) __do____ | 310 |
| "Norit" (decolorizing carbon) _____do____ | 70 |
| High flash point oil (mineral or vegetable such as cotton seed) _____gallons__ | 140 |
| Chlorasol (ethylene dichloride and carbon tetrachloride) _____gallons__ | 70 |

In place of Chlorasol any oil or fat solvent may be used such as benzene or petroleum ethers.

2,000 pounds of potassium permanganate are dissolved in 5,600 gallons of water and to this solution 280 pounds of quinoline is added. Good agitation of the permanganate solution should be maintained during the addition of the quiloline. During the oxidation which follows the temperature of the mixture should not be allowed to rise above 160° F. and a temperature between 120° F. to 150° F. throughout the entire oxidation is desirable. When the last trace of color due to the potassium permanganate, has disappeared, thus indicating the complete reaction, 200 pounds of diatomaceous earth, or "Filter-cel," is added. While still warm this mixture is passed through a pre-coated filter press. The resulting filter cake is washed with 800 gallons of water and the washings and filtrate combined. This combined liquid is then acidified by 300 pounds sulfuric acid until just acid to Congo red, or a pH of about 3 or 4. Quinolinic acid is now precipitated as a copper salt of quinolinic acid by the addition of 400 pounds of copper sulfate pentahydrate (CuSO$_4$—5H$_2$O), bringing the mixture to almost boiling point and maintaining such temperature for thirty minutes. The precipitated copper quinolinate is filtered off and washed with cold water.

The copper quinolinate is now suspended in water using about one gallon of water to two pounds of the salt. To this we add about 110 pounds of sodium hydroxide dissolved in water until the water quinolinate suspension is distinctly alkaline. This alkaline solution is then boiled slowly and the copper precipitates as copper oxide and sodium quinolinate is formed, dissolving in the water. The solution is filtered while still hot.

In order to form quinolinic acid, the above filtrate is cooled to 60° F. and acidified with sulfuric acid to a pH of 1.6. This requires about 110 pounds of sulfuric acid. The quinolinic acid precipitates and when precipitation is complete it is filtered through a filter press, washed with cold water and carefully dried in a suitable drying apparatus.

The final step in the process comprises the conversion of this crude quinolinic acid into nicotinic acid by decomposition of the former. For this conversion one pound of crude quinolinic acid is suspended in approximately one gallon of a high flash point mineral or vegetable oil. For the purpose of illustration here, cotton seed oil is used. Placed in a steam jacketed kettle the suspension is heated slowly, with good agitation, until a temperature of about 284° F. is reached. From this point the temperature is raised carefully until foaming stops, usually between 350°–375° F. Between these temperatures (284°–375° F.) the quinolinic acid decomposes, forming nicotinic acid and the decomposition is complete upon the cessation of the foaming. The temperature is again slowly raised to 375°–400° F. and allowed to cool to between 150°–180° F. when the mixture is filtered through a filter press giving a filter cake of crude nicotinic acid. This cake is then washed with Chlorasol, a combination of ethylene dichloride and carbon tetrachloride to remove the oil and allowed to dry until it emits no further odor of Chlorasol. Petroleum ether or benzene may be used in place of the Chlorasol, the procedure being the same.

Purification of the crude nicotinic acid consists in dissolving the cake in water in proportion of 60 pounds of cake to 100 gallons of solution and boiling the mixture until the cake is completely dissolved. Any oil scum on the surface is skimmed off and 15 pounds of "Norit," a decolorizing carbon is added, the mixture maintained at boiling point for from fifteen to twenty minutes, with agitation, filtering through a filter press immediately at the expiration of the time period and while still boiling hot. The filter cake is washed with a small amount of water while still in the press.

The filtrate is cooled to 60° F. or lower and allowed to stand for from twelve to sixteen hours. Flaky white lumps of pure nicotinic acid crystallize and are filtered off, washed with a small amount of cold water and dried.

To make the process of manufacture as economical and effective as possible the filtrate from the first quinolinic precipitation may be treated with about 40 pounds of copper pentahydrate ($CuSO_4$—$5H_2O$) and boiled. The copper quinolinate is precipitated and nicotinic acid recovered as above described. Similarly, the filtrate from the first nicotinic acid crystallization may be condensed to one third of its original volume and cooled. The crystallized nicotinic acid is filtered out, washed and dried. The used decolorizing carbon and the third filtrate from nicotinic acid solution are boiled and filtered. After cooling additional nicotinic acid can be filtered out.

In the example given the yield is as follows:

| | |
|---|---|
| Crude quinolinic acid _____ pounds | 140 |
| Crude nicotinic acid _____ do____ | 2.25 |
| Pure nicotinic acid _____ do____ | 75 |

The product has no characteristic odor, its crystalline structure is of flaky nature, while in color, readily soluble in hot water and hot alcohol, but difficultly soluble in ether. An aqueous solution is slightly acid to Congo red and its melting point is from 233–235° C. using microscopic melting point apparatus with rate of heating, four degrees in one minute. It can be prepared in tablet form for administration in the treatment of the diseases in which it is indicated.

We claim:

1. The process of preparing nicotinic acid which comprises converting quinolinic acid by heating it in the range of 284–400° F. in the presence of a nonreactive heat transfer liquid having a higher boiling point than the temperature of the decomposition.

2. The process of preparing nicotinic acid which comprises converting quinolinic acid by heating it in the range of 284–400° F. in the presence of a high flash point oil.

HOWARD F. SEIBERT.
JOSEPH M. TABOR.
JURO WYENO.